United States Patent
Eyster et al.

(10) Patent No.: US 10,662,103 B2
(45) Date of Patent: *May 26, 2020

(54) TREATMENT OF SLUDGES AND FLOCCULANTS USING INSOLUBLE MINERAL COLLOIDAL SUSPENSIONS

(71) Applicant: Heritage Research Group, Indianapolis, IN (US)

(72) Inventors: Perry Eyster, Brownsburg, IN (US); Christopher D. Weber, Greenwood, IN (US)

(73) Assignee: Heritage Research Group, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,984

(22) Filed: Sep. 26, 2017

(65) Prior Publication Data

US 2018/0086657 A1 Mar. 29, 2018

Related U.S. Application Data

(60) Provisional application No. 62/399,899, filed on Sep. 26, 2016.

(51) Int. Cl.
| | |
|---|---|
| *C02F 11/14* | (2019.01) |
| *C02F 11/143* | (2019.01) |
| *C02F 11/145* | (2019.01) |
| *C02F 11/127* | (2019.01) |
| *C02F 1/52* | (2006.01) |
| *B01D 21/26* | (2006.01) |
| *C02F 1/38* | (2006.01) |
| *C02F 1/24* | (2006.01) |
| *B01D 21/01* | (2006.01) |
| *C02F 11/148* | (2019.01) |
| *C02F 11/121* | (2019.01) |

(52) U.S. Cl.
CPC ............ *C02F 11/14* (2013.01); *B01D 21/262* (2013.01); *C02F 1/38* (2013.01); *C02F 1/5236* (2013.01); *C02F 11/127* (2013.01); *C02F 11/143* (2019.01); *C02F 11/145* (2019.01); *B01D 21/01* (2013.01); *C02F 1/24* (2013.01); *C02F 11/121* (2013.01); *C02F 11/148* (2019.01)

(58) Field of Classification Search
None
See application file for complete search history.

(56) References Cited

U.S. PATENT DOCUMENTS

| | | | | | |
|---|---|---|---|---|---|
| 4,037,781 | A | * | 7/1977 | High .......................... | B04B 1/20 494/51 |
| 4,053,401 | A | * | 10/1977 | Fukushima ................ | C02F 1/52 210/728 |
| 4,168,228 | A | | 9/1979 | Mallatt et al. | |
| 4,559,143 | A | * | 12/1985 | Asada ..................... | B01D 37/02 210/714 |
| 4,814,092 | A | * | 3/1989 | Patzelt .................... | B01D 17/00 210/708 |
| 4,830,754 | A | * | 5/1989 | Nowak ................ | B01D 17/042 210/639 |
| 4,839,022 | A | * | 6/1989 | Skinner ................. | B01D 17/00 208/13 |
| 4,852,269 | A | * | 8/1989 | Glorioso ................. | C02F 11/12 34/376 |
| 5,098,584 | A | * | 3/1992 | Leen ...................... | B01D 37/00 210/768 |
| 5,853,677 | A | * | 12/1998 | Avotins .................. | B01D 21/01 423/121 |
| 5,948,269 | A | * | 9/1999 | Stone .................... | C02F 1/5245 210/718 |
| 5,958,241 | A | * | 9/1999 | DeBenedetto ............ | C02F 1/24 210/611 |
| 6,132,630 | A | * | 10/2000 | Briant .................... | B01D 17/00 210/774 |
| 2004/0129175 | A1 | * | 7/2004 | Butters ................. | B01D 53/501 106/461 |
| 2005/0016919 | A1 | * | 1/2005 | Hagino .................. | C02F 1/5254 210/613 |
| 2010/0065497 | A1 | * | 3/2010 | Daines-Martinez ...... | C02F 9/00 210/638 |
| 2010/0224577 | A1 | * | 9/2010 | Ball ........................ | C02F 1/001 210/803 |
| 2015/0096925 | A1 | * | 4/2015 | Hines ...................... | B03D 1/01 209/164 |

FOREIGN PATENT DOCUMENTS

WO WO 03-050043 A2 6/2003

OTHER PUBLICATIONS

FloMag, p. 1, published Jan. 28, 2015 (Year: 2015).*
International Search Report and Written Opinion from corresponding PCT application No. PCT/US2017/053465 dated Jan. 11, 2018 (13 pgs).
International Preliminary Report on Patentability and Written Opinion from corresponding PCT application No. PCT/US2017/053465 dated Apr. 4, 2019 (10 pgs).

* cited by examiner

*Primary Examiner* — Clare M Perrin
(74) *Attorney, Agent, or Firm* — Woodard, Emhardt, Henry, Reeves & Wagner, LLP

(57) ABSTRACT

A method of separating sludges which involves adding an insoluble mineral colloidal suspension into an industrial sludge to destabilize the industrial sludge and separating destabilized components of the industrial sludge. The insoluble mineral colloidal suspension can be adding into the industrial sludge or formed in situ therein by components into the industrial sludge that react together therein to form the insoluble mineral colloidal suspension.

18 Claims, No Drawings

TREATMENT OF SLUDGES AND FLOCCULANTS USING INSOLUBLE MINERAL COLLOIDAL SUSPENSIONS

RELATED APPLICATION

This application is based upon U.S. Provisional Application Ser. No. 62/399,899, filed Sep. 26, 2016 to each of which priority is claimed under 35 U.S.C. § 120 and of which the entire specification is hereby expressly incorporated by reference.

BACKGROUND

The present invention relates generally to separating sludges and more particularly to the use of insoluble mineral colloidal suspensions that can be added to or formed in situ in sludges and/or floats to aid in separation.

The wastewater produced from different kinds of industries normally contains very fine suspended solids, dissolved solids, inorganic and organic particles, metals and other impurities. Due to very small size of the particles and presence of surface charge, the task to bring these particles closer to make heavier mass for settling and filtration becomes challenging.

Petroleum refining generates large volumes of oily wastewater. With industrial development, there is increase in the amount of oil used. Oil refining, oil storage, transportation and petrochemical industries in the production process generate a lot of oily wastewater.

Separating sludge increases recycled content, reduces the overall volume of waste generated as well as increases the outlets available for disposal. Industrial wastewater sludges are often difficult to separate due to relative density of the components as well as particle size and charge distribution. For example, refinery sludge is becoming increasingly difficult to process as the inorganic content of the crude slate increases. Various processes throughout refineries increase both the organic content in the form of polymer flocculants and the inorganic content captured by the flocculants.

The low density of particulates in the sludge combined with the low density of the accumulated spent flocculants and the increased density of the water component, with high dissolved solids, results in poor separation.

Various traditional and advanced technologies have been utilized to remove the colloidal particles from wastewater; such as ion exchange, membrane filtration, precipitation, flotation, solvent extraction, adsorption, coagulation, flocculation, biological and electrolytic methods.

Traditional approaches include the addition of bentonite, lime, ferric compounds, or varying combinations of expensive coagulants and flocculants. These are often ineffective or require significant dosing rates.

Petroleum refiners use Dissolved Nitrogen Floatation (DNF) units for clarifying wastewater from a variety of refining processes that include washing from a desalter and other wastewater generated processes within a refinery.

DNF units force nitrogen under pressure in the form of microscopic bubbles often with a coagulant additive to float particulate matter that has densities near that of water to the top of the unit where they are skimmed off. Solids that are higher in density sink to the bottom where they are collected separately. The middle phase which is absent of solids is sent to wastewater treatment for processing before discharge.

The DNF bottom sludge and top float are often combined for further treatment. According to one aspect the present invention relates to processing of the combined DNF sludge and float.

Coagulation is the destabilization of colloidal particles brought about by the addition of a chemical reagent known as a coagulant. Flocculation is the agglomeration of destabilized particles into microfloc, and later into bulky floccules which can be settled called floc.

Coagulation is the process by which colloidal particles and very fine solid suspensions initially present in a wastewater stream are combined into larger agglomerates that can be separated by means of sedimentation, flocculation, filtration, centrifugation, or other separatory methods. This involves a chemical process in which destabilization of non-settleable particles is realized. These non-settleable particles can include most colloids as well as extremely small solid particles and all solvated (dissolved) particles. These particles form clumps with the help of a coagulant. Coagulation is commonly achieved by adding different types of chemicals (coagulants) to the wastewater stream to promote destabilization of any colloid dispersion present and the agglomeration of the individual resultant colloidal particles. Coagulation is the destabilization of these colloids by neutralizing the electrostatic forces that keep them apart. Cationic coagulants provide positive electrostatic charges to reduce the negative electrostatic charges (zeta potential) of the colloids. As a result, these particles collide to form these larger floc particles.

Flocculation refers to the coming together of particles by means of a physical or mechanical process resulting in the joining together of large aggregated clumps (or flocs) to form larger masses and eventually to precipitate them from the liquid phase and thereby convert them into the solid phase for further separation. In coagulation, these forces responsible for keeping the particles suspended and dispersed after they contact each other are reduced. This is usually referred to as collapsing the colloid and/or precipitate formation in the case of solvated particles. Flocculation joins these de-established colloidal dispersions into large aggregates that enter the solid phase.

According to the present invention the addition or in situ formation of insoluble mineral colloidal suspensions in DNF sludges and floats is used to destabilize DNF sludge and/or float wastes for purposes of separation and component recovery. Further, these materials have improved separation in DNF, Dissolved Air Flotation (DAF), and American Petroleum Institute Separator (API Separator), and tank clean-out sludges.

BRIEF SUMMARY

According to various features, characteristics and embodiments of the present invention which will become apparent as the description thereof proceeds, the present invention provides a method of separating sludges which comprises:

obtaining an industrial sludge;

adding an insoluble mineral colloidal suspension into the industrial sludge to destabilize the industrial sludge; and separating destabilized components of the industrial sludge.

The present invention further provides an improvement in processes for physically separating components of a sludge which improvement comprises adding insoluble mineral colloidal suspension into the sludge prior to physically separating components of the sludge.

DETAILED DESCRIPTION OF THE DRAWINGS AND THE PRESENTLY PREFERRED EMBODIMENTS

The present invention relates generally to separating sludges and more particularly to the addition of insoluble mineral colloidal suspensions to DNF, DAF, and API sludges, and other sludge wastes for purposes of separation and component recovery.

The insoluble colloidal mineral suspension used in the present invention can be added to the sludges and/or floats or can be generated in situ by forming the insoluble colloidal mineral suspension from a multi-component mixture that is added to the sludges and reacts to produce the insoluble mineral colloidal suspensions in situ. In further embodiments of the present invention certain waste streams yielding precipitated suspensions of insoluble minerals have also proven effective. For example, the slurry formed by concentrating the solids from lime softening of hard water results in a suspension suitable for use in the disclosed invention. Those familiar with the art will understand the benefits of using these materials to destabilize various types of sludge including DNF, DAF, API, and other sludge and/or float wastes.

Adding an insoluble colloidal mineral suspension into an industrial sludge directly or forming the insoluble colloidal mineral suspension in situ in an industrial sludge according to the present invention causes colloidal particles and very fine solid suspensions initially present in the industrial sludge to combine into larger agglomerates that can be separated by means of sedimentation, flocculation, filtration, centrifugation, or other separatory methods.

The insoluble colloidal mineral suspensions of the present invention can include alkaline earth salt precipitates such as calcium sulfate and barium sulfate which can be added into an industrial sludge or formed therein by reacting alkaline earth metals with sulfuric acid to form the corresponding salts.

In other embodiments a source of iron such as ferric chloride or ferrous chloride are reacted with hydroxide ions (from a soluble alkali hydroxide or alkaline hydroxide) to form insoluble iron hydroxides.

In further embodiments soluble salts such as calcium chloride and be reacted with sulfates or carbonates such as magnesium or sodium sulfate or sodium carbonate to form insoluble calcium salts including calcium sulfate and calcium carbonate.

The insoluble colloidal mineral suspensions can have percent solids deemed sufficient to allow material management, such as pumpability, but not so low as to burden the system with unnecessary additional water. Typically, 25-60% solids by weight is generally suitable for purposes of the present invention. For insoluble mineral suspension that are formed in situ a comparative solids percentage by weight can be achieved by factoring in the solids percent of the components that are combined to form the resulting insoluble mineral suspension. The concentration of soluble salts should be below the maximum solubility for the operating condition for a selected salt and sufficiently high enough in concentration as to not burden the system with unnecessary additional water.

Examples of a waste streams that includes precipitated suspensions of insoluble minerals which can be used as an insoluble colloidal mineral suspending according to the present invention includes slurries made from solids recovered from lime-softening of boiler water and/or cooling tower water.

While the insoluble colloidal mineral suspension used according to the present invention causes colloidal particles and very fine solid suspensions initially present in an industrial sludge to combine into larger agglomerates, it can be understood that the addition of other known coagulants and/or flocculants can also be used to aid and improved agglomeration and clumping for separation purposes According to the present invention exemplary sludges include industrial wastewater sludges in general, refinery sludges and in particular sludges from processes such as DNF, DAF, API separators, and tank clean-out sludges.

For purposes of the present invention conventional flocculants/coagulants can also be used including mineral, natural and synthetic materials as well as those listed above.

EXAMPLES

The following non-limited Examples are provided to illustrate various features and characteristics of the present invention which are not intended to be specifically limited thereto.

Example 1

In this example DNF sludge and float were transferred from a DNF tank to a smaller tank where a 50-60% solids by weight suspension of calcium sulfate or barium sulfate in water was added at 1.5%-2.5% by volume of the DNF sludge and float. A coagulant (water soluble polymer) was added at 100 to 1000 parts per million to aid in separation. The combined mixture was heated from ambient temperature to 170° F. The heated material was then fed to a three phase centrifuge to separate clean water (centrate), oils and solids. The centrate had the characteristic of having less than 1% particulate solids and could be sent back (recovered and recycled) to the DNF or sent on to wastewater treatment. The oil could be recovered (and recycled) and the solids could be disposed of.

Example 2

In this example the same procedure in Example 1 above was followed expect a calcium hydroxide slurry was fed into the DNF sludge and float followed by the addition of sulfuric acid to adjust pH suitable for polymer activity (pH 7-11). Alternatively the pH of the calcium hydroxide slurry can be adjusted just prior to introduction into the sludge or through the proper blending of calcium hydroxide and calcium sulfate to yield the same effective pH.

Example 3

In this example the same procedure of Example 1 and 2 above was followed except ferric chloride (an alternatively ferrous chloride) was introduced into the DNF slurry and float together with soluble alkali/alkaline hydroxide to adjust pH to form insoluble iron hydroxides.

Example 4

In this example the same procedure of Examples 1-3 above was following except soluble salts such as calcium chloride were introduced into the DNF slurry and float, followed alternatively by magnesium sulfate, sodium sulfate, or sodium carbonate, to yield the respective, insoluble calcium salts, calcium sulfate or calcium carbonate which were all proven to be effective for purposes of the present invention.

Example 5

In this example the same procedure of Example 1 above was followed except solids recovered from lime-softening of boiler water and cooling tower water was made into a slurry or alternatively recovered as a slurry, and introduced into the DNF sludge prior to separation. A 40% solution prepared from lime-softening solids was added at 1.5% by volume of the DNF sludge and float.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of separating sludges which comprises:
obtaining an industrial sludge comprising a mixture of an oil, water, and suspended particles;
adding an insoluble mineral colloidal suspension into the industrial sludge to form an agglomeration comprising the suspended particles and the insoluble mineral; and
separating each of the agglomeration, the oil, and the water components of the industrial sludge with a process consisting essentially of three-phase centrifugation.

2. A method of separating sludges according to claim 1, wherein at least one of a flocculant or a coagulant is added to the industrial sludge to aid in the formation of the agglomeration.

3. A method of separating sludges according to claim 1, wherein the insoluble mineral colloidal suspension is added into the industrial sludge by forming the insoluble mineral colloidal suspension in situ in the industrial sludge.

4. A method of separating sludges according to claim 1, wherein the industrial sludge is a waste water sludge.

5. A method of separating sludges according to claim 1, wherein the industrial sludge is refinery sludge.

6. A method of separating sludges according to claim 1, wherein the industrial sludge is a combined bottom sludge and top float.

7. A method of separating sludges according to claim 1, wherein the insoluble mineral colloidal suspension is formed in situ in the industrial sludge by adding components into the industrial sludge that react together therein to form the insoluble mineral colloidal suspension.

8. A method of separating sludges according to claim 1, wherein the insoluble mineral colloidal suspension is an insoluble magnesium hydroxide colloidal suspension having a solids percent by weight of at least 25%.

9. A method of separating sludges according to claim 1, wherein the insoluble mineral colloidal suspension has a solids percent weight of up to 65%.

10. A method of separating sludges according to claim 1, wherein the insoluble mineral colloidal suspension has a solids percent by weight that ranges from 25% to 65%.

11. A method of separating sludges according to claim 1, wherein the insoluble mineral colloidal suspension comprises an alkaline earth salt.

12. A method of separating sludges according to claim 11, wherein the insoluble mineral colloidal suspension comprises a calcium salt.

13. A method of separating sludges according to claim 1, wherein the insoluble mineral colloidal suspension comprises an iron hydroxide.

14. A method of separating sludges according to claim 1, wherein the insoluble mineral colloidal suspension comprises insoluble precipitates from a lime softening water treatment process.

15. The method of claim 1, further comprising adding at least one coagulant to the industrial sludge.

16. The method of claim 15, wherein the agglomeration further comprises the coagulant.

17. The method of claim 16, wherein the at least one coagulant comprises a water soluble polymer.

18. The method of claim 1, wherein the oil comprises a petroleum oil.

* * * * *